United States Patent Office 2,867,831
Patented Jan. 13, 1959

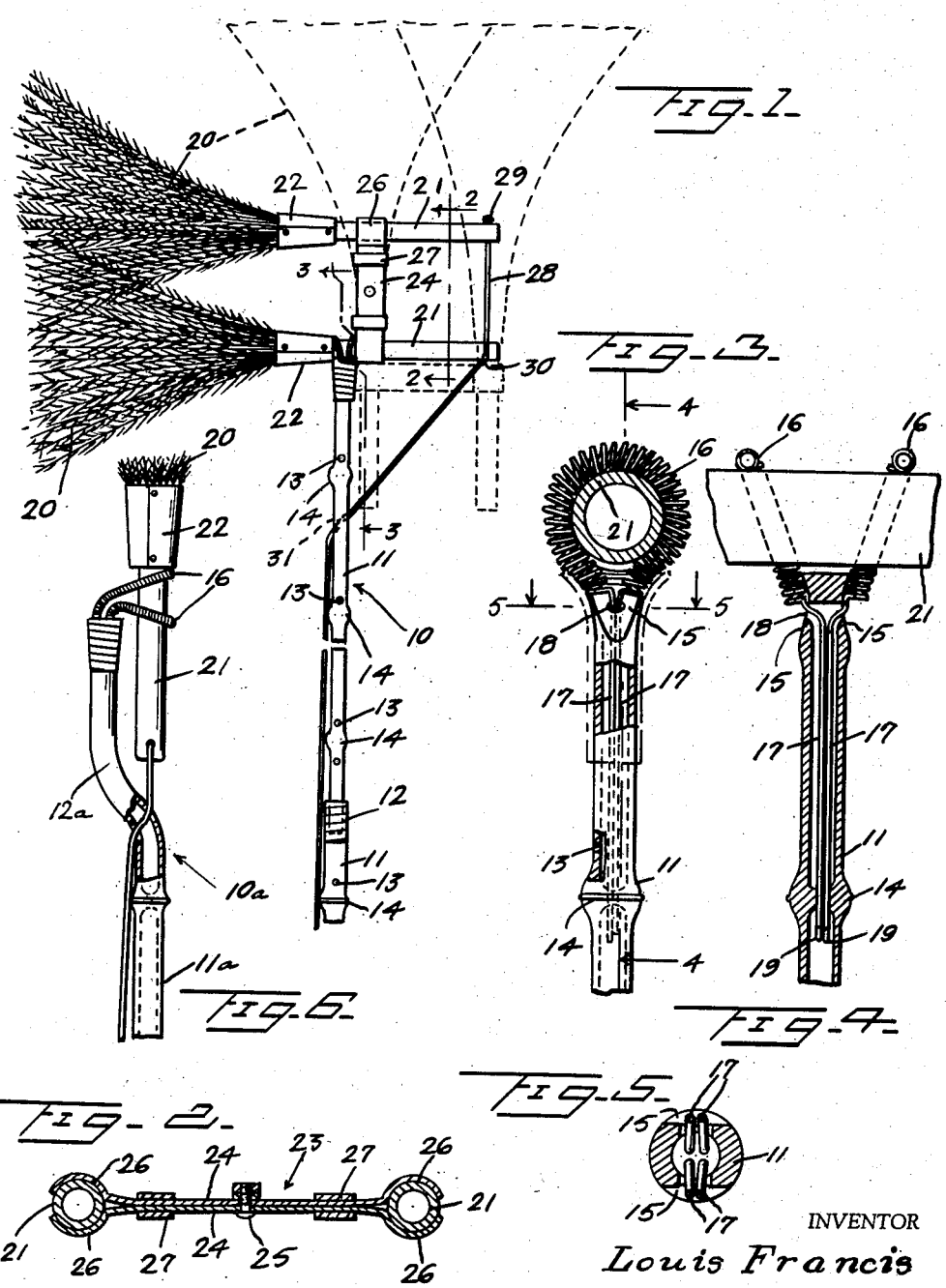

2,867,831

ADJUSTABLE CLEANING IMPLEMENT

Louis Francis, Miami, Fla.

Application February 20, 1958, Serial No. 716,462

5 Claims. (Cl. 15—234)

The present invention relates to adjustable cleaning implements, and particularly to cleaning implements for cleaning extremely high structures and inaccessible places.

The primary object of the invention is to provide a light weight cleaning implement having a flexible support shaft and a readily adjustable cleaning head.

A further object of the invention is to provide a cleaning implement of the class described above having extensions to facilitate the use of the implement at varying heights.

Another object of the invention is to provide a cleaning implement of the class described above which can be supported on the shoe toe while in use to facilitate the moving of the implement from place to place.

Another object of the invention is to provide a cleaning device of the class described above which utilizes natural bamboo for the support shaft thereof.

Other objects and advantages will become apparent in the following specification when considered in the light of the attached drawings, in which:

Figure 1 is a fragmentary side elevation of the invention with a second position of the cleaning implement shown in dotted lines.

Figure 2 is an enlarged fragmentary vertical cross-section taken along the line 2—2 of Figure 1, looking in the direction of the arrows.

Figure 3 is an enlarged fragmentary vertical cross-section taken along the line 3—3 of Figure 1, looking in the direction of the arrows.

Figure 4 is a fragmentary vertical section taken along the line 4—4 of Figure 3, looking in the direction of the arrows.

Figure 5 is an enlarged fragmentary horizontal section taken along the line 5—5 of Figure 3, looking in the direction of the arrows.

Figure 6 is a fragmentary side elevation of a modified form of the invention, shown partially broken away and in section for convenience of illustration.

Referring now to the drawings in detail wherein like reference characters indicate like parts throughout the several figures, the reference numeral 10 indicates generally a cleaning implement constructed in accordance with the invention.

The cleaning implement 10 includes a plurality of bamboo poles 11 telescopically fitted together in end to end relation at 12 to form an elongated implement handle. The bamboo poles 11 are provided with a plurality of bores 13 with one of the bores 13 lying between adjacent joints 14 therein. The bores 13 equalize the internal and external pressures in the bamboo pole 11 and assist in preventing fracturing and breaking of the pole 11.

The upper end of the upper pole 11 has the opposite sides chamfered at 15 in upwardly converging relation. A coil spring 16 has elongated shafts 17 integrally formed on opposite ends thereof and the spring 16 is formed into a circle with the shafts 17 extending through bores 18 in the chamfered ends 15.

The shafts 17 have their terminal ends sharpened at 19 and are forced downwardly to pierce the joint 14 next adjacent to the chamfered end 15. The coil springs 16 are arranged in spaced apart substantially parallel relation and the angle therebetween is controlled by the angle of the chamfer 15 on the end of the pole 11.

A feather duster 20 is secured to a hollow shank 21 by means of a ferrule 22, and the hollow shank 21 extends through and is grasped by the springs 16, as can be seen in Figures 3 and 4. A second feather duster 20 mounted to a second shank 21 by means of a second ferrule 22 is secured to the first feather duster 20 in spaced parallel relation thereto by means of a bracket generally indicated at 23.

The bracket 23 includes a pair of elongated flat arms 24 secured together centrally by means of a bolt 25. The arms 24 each have semi-cylindrical clamp members 26 formed on their opposite ends in opposing relation to each other. The semi-cylindrical clamp members 26 encompass the shanks 21 and are clamped thereto by means of sliders 27 engaged about the arms 24 and adapted to be slid toward the clamp members 26 to bind them together.

A cable 28 has its upper end secured at 29 to the upper shank 21 and is secured to the lower shank 21 at 30. The cable 28 extends downwardly from the lower shank 21 and passes through the pole 11 at 31 to form a guide therefor. The cable 28 depends from the upper end of the pole 11 generally parallel thereto and is arranged to be grasped by the hand of the operator to pull the feather dusters 20 to the dotted line position illustrated in Figure 1.

The tension of the coil springs 16 permits the shanks 21 to be tilted to the position illustrated in dotted lines in Figure 1, and when the pressure on the cable 28 is released, the coil springs 16 will return the feather dusters 20 to their full line horizontal position, as shown in Figure 1.

The lower shank 21 grasped by the springs 16 can be rotated on its own axis within the springs 16 to arrange the feather dusters 20 in horizontal side by side relation or with the upper shank 21 pivoted to underlie the lower shank 21. Obviously, the feather dusters 20 can be pivoted any desired amount between the extremes mentioned above.

In Figure 6 of the drawings, a modified form of the invention is illustrated wherein the cleaning implement 10a has a pole 11a with the upper end thereof offset at 12a so that the shank 21 of a feather duster 20 is axially aligned with the pole 11a when the feather duster 20 is in its vertical position. In the modification illustrated in Figure 6, only one feather duster 20 is shown, however, it should be understood that the bracket 23 may be used to support a second feather duster 20 when desired.

The use of bamboo in the formation of the poles 11, 11a in the present invention provides whip-like flexibility to permit rapid movement of the feather dusters 20 in dusting relatively high structures.

The shafts 17 on the springs 16 passing through the joint 14 of the pole 11 assist in providing rigidity for the uppermost section of the pole 11 to prevent breakage.

The chamfered faces 15 on the upper end of the pole 11 apply an outward pressure to the springs 16 so that the springs 16 grasp the shank 21 with a cam action.

Having thus described the preferred embodiments of the invention, it should be understood that numerous other structural modifications and adaptations may be re-

What is claimed is:

1. A cleaning implement comprising an elongated highly flexible bamboo handle, a pair of coil spring loops secured to an end of said handle, said loops being arranged in closely spaced relation extending generally longitudinally with respect to said handle and diverging in a direction away from said handle, a shank extending through and grasped by said spring loops with said shank normally extending transversely to the longitudinal axis of said handle, and a duster secured to one end of said shank for engaging and moving over a remote surface to be cleaned on whip like movement of said bamboo handle.

2. A device as claimed in claim 1 wherein means are provided secured to one end of said shank for swinging said duster into aligned relation with respect to said handle.

3. A device as claimed in claim 1 wherein a second shank is positioned in spaced parallel relation to said first shank and detachable clamp means is provided securing said shanks together, said second shank having a duster secured to one end thereof.

4. A device as claimed in claim 1 wherein said spring loops are each provided with integral shafts at the opposite ends thereof, and said shafts are inserted in an end of said bamboo handle.

5. A device as claimed in claim 4 wherein an end of said bamboo handle is chamfered and said shafts extend through the chamfered portion and through an adjacent natural node in the bamboo handle.

References Cited in the file of this patent

UNITED STATES PATENTS

| | | |
|---|---|---|
| 467,046 | Myers | Jan. 12, 1892 |
| 1,185,732 | Swayne | June 6, 1916 |
| 2,346,570 | Francis | Apr. 11, 1944 |

FOREIGN PATENTS

| | | |
|---|---|---|
| 247,968 | Switzerland | Jan. 3, 1948 |